United States Patent
Schlosser et al.

(10) Patent No.: US 6,776,053 B2
(45) Date of Patent: Aug. 17, 2004

(54) FLOWMETER FOR THE PRECISION MEASUREMENT OF AN ULTRA-PURE MATERIAL FLOW

(75) Inventors: Martin Andrew Schlosser, Boulder, CO (US); Mark James Bell, Arvada, CO (US); Matthew Glen Wheeler, Arvada, CO (US); Daniel Patrick McNulty, Westminster, CO (US); Gary Edward Pawlas, Louisville, CO (US)

(73) Assignee: Emerson Electric, Inc., St. Louis, MO (US)

( * ) Notice: Subject to any disclaimer, the term of this patent is extended or adjusted under 35 U.S.C. 154(b) by 0 days.

(21) Appl. No.: 09/994,251

(22) Filed: Nov. 26, 2001

(65) Prior Publication Data

US 2003/0097881 A1 May 29, 2003

(51) Int. Cl.[7] .................................................. G01F 1/78
(52) U.S. Cl. .................................................. 73/861.355
(58) Field of Search ...................... 73/861.355, 861.357, 73/861.354, 861.356

(56) References Cited

U.S. PATENT DOCUMENTS

| | | | |
|---|---|---|---|
| 4,628,744 A | | 12/1986 | Lew |
| 4,729,243 A | * | 3/1988 | Friedland et al. ...... 73/861.355 |
| 4,813,289 A | * | 3/1989 | Lew ....................... 73/861.357 |
| 5,027,662 A | | 7/1991 | Titlow et al. |
| 5,078,014 A | * | 1/1992 | Lew ....................... 73/861.355 |
| 5,157,975 A | * | 10/1992 | Tanaka et al. .......... 73/861.355 |
| 5,400,653 A | * | 3/1995 | Kalotay .................. 73/861.355 |
| 5,403,533 A | | 4/1995 | Meier |
| 5,448,921 A | | 9/1995 | Cage et al. |
| 5,627,326 A | * | 5/1997 | Alesz et al. ............ 73/861.357 |
| 5,705,754 A | * | 1/1998 | Keita et al. ............. 73/861.357 |
| 5,814,739 A | | 9/1998 | Van Cleve |
| 5,918,285 A | | 6/1999 | Van der Pol |
| 5,979,246 A | * | 11/1999 | Van Cleve et al. ..... 73/861.357 |
| 6,244,110 B1 | * | 6/2001 | Takeuchi et al. ......... 73/504.12 |
| 6,286,373 B1 | * | 9/2001 | Lister et al. ............ 73/861.355 |
| 6,336,370 B1 | * | 1/2002 | van der Pol ........... 73/861.357 |
| 6,360,614 B1 | * | 3/2002 | Drahm et al. .......... 73/861.357 |
| 6,363,794 B1 | * | 4/2002 | Van Cleve ............. 73/861.357 |
| 6,450,042 B1 | * | 9/2002 | Lanham et al. ........ 73/861.357 |
| 2001/0006007 A1 | | 7/2001 | Davies et al. |

FOREIGN PATENT DOCUMENTS

| | | |
|---|---|---|
| DE | 4119396 C1 | 8/1992 |
| WO | WO-01/65213 A1 | 9/2001 |

* cited by examiner

Primary Examiner—Edward Lefkowitz
Assistant Examiner—Jewwl V. Thompson
(74) Attorney, Agent, or Firm—Duft Setter Ollila & Bornsen LLC

(57) ABSTRACT

A Coriolis flowmeter for the measurement of a process material requiring an ultra high level of purity. This is achieved by forming the entire Coriolis flowmeter of a PFA plastic material that does not transfer ions from the Coriolis flowmeter to the process material flowing through the flowmeter.

44 Claims, 12 Drawing Sheets

FLOWMETER FOR THE PRECISION MEASUREMENT OF AN ULTRA-PURE MATERIAL FLOW

FIELD OF THE INVENTION

This invention relates to a Coriolis flowmeter that measures a flow of process material having an ultra high level of purity.

PROBLEM

It is known to use Coriolis effect mass flowmeters to measure mass flow and other information pertaining to materials flowing through a pipeline as disclosed in U.S. Pat. No. 4,491,025 issued to J. E. Smith, et al. of Jan. 1, 1985 and Re. 31,450 to J. E. Smith of Feb. 11, 1982. Flowmeters have one or more flow tubes of a straight, curved or irregular configuration. Each flow tube has a set of natural vibration modes which may be of a simple bending, torsional, or twisting type. Each material filled flow tube is driven to oscillate at resonance in one of these natural modes. The natural vibration modes are defined in part by the combined mass of the flow tubes and the material within the flow tubes. If desired, a flowmeter need not be driven at a natural mode.

Material flows into the flowmeter from a connected material source on the inlet side. The material passes through the flow tube or flow tubes and exits the outlet side of the flowmeter.

A driver applies force to oscillate the flow tube. When there is no material flow, all points along a flow tube oscillate with an identical phase in the first bending mode of the flow tube. Coriolis accelerations cause each point on the flow tube to have a different phase with respect to other points on the flow tube. The phase on the inlet side of the flow tube lags the driver; the phase on the outlet side leads the driver. Pickoffs are placed on the flow tube to produce sinusoidal signals representative of the motion of the flow tube. The phase difference between two sensor signals is divided by the frequency of oscillation to obtain a delay which is o proportional to the mass flow rate of the material flow.

It is known to use flowmeters having different flow tube configurations. Among these configurations are single tube, dual tube, straight tube, curved tube, and flow tubes of irregular configuration. Most of the flowmeters are made of metal such as aluminum, steel, stainless steel and titanium. Glass flow tubes are also known.

The positive attributes of titanium in flowmeters are its high strength and low coefficient of thermal expansion (CTE). The negative attributes of titanium are its metallic properties and cost of manufacturing. In semiconductor wafer processing, metal ions are a contaminant. Metal ions in contact with the wafer areas of an integrated circuit can cause a short circuit and ruin the device. Also, a Titanium flowmeter is difficult and expensive to produce.

The prior art also suggests plastic flow tubes and plastic flowmeters. This includes prior art in which the entirety of the flowmeter is plastic as well as that in which only the flow tube is formed of plastic. Much of this prior art merely contains an assertion that a flowmeter may be made of various materials such as steel, stainless steel, titanium or plastic. This prior art is not instructive in so far as concerns the disclosure of a plastic Coriolis flowmeter that can accurately output information over a range in operating conditions including temperature.

The mere substitution of a plastic flow tube for a metal flow tube will produce a structure that looks like a flowmeter. However, the structure will not function as a flowmeter to generate accurate output information over a useful range of operating conditions. The mere assertion that a flowmeter could be made out of plastic is nothing more than the abstraction that plastic can be substituted for metal. It does not teach how a plastic flowmeter can be manufactured to generate accurate information over a useful range of operating conditions.

It is a problem in some applications that the typical Coriolis flowmeter may contaminate the process material. This is undesirable for systems in which material of an ultra high level of purity must be delivered by the flowmeter to a user application. This is the case in the fabrication of semi-conductor wafers which requires the use of a process material that is free of contaminants including ions migrating from the tubes of the process material flow path. In such applications, the flow tube can be a source of contaminants. The metal walls of a flow tube can release ions into the process material flow. The released ions can cause the chips on a semi-conductor wafer to be defective. The same is true for a glass flow tube which can release the lead ions from the glass into the process material flow. The same is also true for the flow tubes formed of conventional plastics.

A plastic termed PFA is free from this objection since the material of which it is composed does not release deleterious ions into the material flow. The use of PFA for a flow tube is suggested in U.S. Pat. No. 5,918,285 to Vanderpol. This suggestion is incidental to the Vanderpol disclosure since the patent discloses no information regarding how a flowmeter having a PFA flow tube could be manufactured to generate accurate flow information.

Flow tubes lined with PFA, as disclosed in U.S. Pat. No. 5,403,533 to Dieter Meier, attempted to combine the positive attributes of both metal and plastic technologies but encountered new challenges that could not be solved until the present invention. Metal flow tubes lined with PFA allow metal ions to migrate through the thin PFA coating layer and into the flow stream to cause contamination. Also, the metal flow tube material and the PFA liner have different thermal properties. This caused the PFA liner to disengage from the flow tube to create leaks and performance problems. The manufacturing process for lining the metal flow tubes with PFA is also extremely costly.

SOLUTION

The above and other problems are solved and an advance of the art is achieved by the present invention which discloses a Coriolis flowmeter having at least one flow tube formed of perfluoroalkoxy copolymer (PFA) plastic. The flow tube is coupled to a driver and to at least one pickoff sensor to enable the PFA flow tube to function as part of Coriolis flowmeter that can provide accurate output information over range of operating conditions for a process material flow of ultra high purity suitable for use in applications such as semi-conductor fabrication and the like which require the material flow to be free of contaminants down to the ionic level.

A flow path constructed entirely of PFA has many of the benefits of Titanium and PFA lined flow tubes without the drawbacks. PFA is a fluoropolymer with superior chemical resistance, little metal ion release, low particle generation, and is manufacturable without expending large amounts of capital. PFA material is strong and can be extruded into high quality thin wall tubing. Thin-walled PFA tubing has low flexural stiffness enabling a higher sensitivity to mass flow rate and improved immunity to elastic dynamic interaction between the flow tube and the process pipeline. The material and physical properties of PFA allow larger tube vibration amplitudes at lower stress levels and result in near infinite fatigue life span. Also, the higher vibration amplitude allows the use of small low-mass transducers, which in turn improves density sensitivity and immunity to mount variation.

A first preferred exemplary embodiment of the invention comprises a flowmeter having a single PFA plastic flow tube coupled to a massive metal base which balances the end node vibration of the flow tube. The base is U-shaped and the plastic flow tube extends through coaxial holes in the two legs of the U. The plastic flow tube is affixed to the holes in the base by means of an appropriate adhesive such as cyanoacrylate also termed Loctite 420. The longitudinal center of the flow tube is affixed to an electromagnetic driver which receives a drive signal from a meter electronics to vibrate the flow tube transversely to the longitudinal axis of the flow tube. This vibration may be at the first bending resonant frequency of the flow tube. The flow tube is coupled to pickoffs which detect the Coriolis response of the vibrating flow tube with material flow. In the first embodiment, the pickoffs may be a conventional electromagnet combination with magnets affixed to the flow tube and a coil affixed to the base. In an alternative embodiment, the pickoffs are optical devices which generate a light beam and that is modulated by the vibrations of the flow tube. The optical sensing embodiment offers the advantage that the weight of the pickoff magnets is removed from the vibrating flow tube. This increases density sensitivity. The driver is a source of heat that can raise the temperature of the plastic; thermally expand the plastic and degrade the accuracy of the generated output information. In this embodiment, the driver is advantageously affixed on top of the flow tube when in use. This mounting arrangement has the advantage that the heat generated by the driver radiates upwardly away from the flow tube.

In accordance with another embodiment, the magnets associated with the driver and sensor pickoffs have low mass since they are small and do not have keepers or pole pieces. The magnets and coils have been optimized to make the magnets as small (low mass) as possible. The magnet material has been chosen to have the most magnetic field per unit mass as possible. The tube geometry has been designed to achieve the desired motion with as little drive force as possible. PFA has naturally low damping, so drive force is inherently low due to selecting this material for the flow tube. All of these factors contribute to achieving low mass transducer parts on the flow tube. This is advantageous since it reduces the physical loading of the flow tube and enhances the output accuracy of the flowmeter.

The single flow tube comprises an unbalanced structure whose vibration is minimized by the massive base. The ratio of the mass of the base to mass of the single plastic flow tube together with its magnetic material mass is in the order of 3,000 to 1. This results in a heavy base structure having a weight of approximately 13 pounds for a flow tube, plus magnets and material mass having a total weight of about 2 grams. Although the 13 pound weight minimizes the vibrations at the nodes of the flow tube, it has a disadvantage of increasing the weight of the equipment of which the flowmeter is a part. These vibrations may be minimized by the use of a dynamic balancer or a active dynamic balancer. The active dynamic balancer transmits signals to the meter electronics which analyzes the signals and returns a control signal to the active dynamic balancer to reduce the undesired vibrations. This has the advantage that the overall weight of the base structure may be reduced from 13 pounds down to about 2 pounds.

As mentioned, the first preferred embodiment comprises a Coriolis flowmeter having a single straight tube operating in an unbalanced mode in cooperation with a massive base. Other flow tube configurations are provided by other embodiments of the invention. The invention may be practiced with the use of dual flow tubes vibrating in phase opposition. These dual tubes may either be straight, they may be u-shaped, or they may be of a irregular configuration. The use of dual flow tubes is advantageous in that it provides a dynamically balanced structure that reduces the mass of the base required to mount the flow tubes.

An additional embodiment that can be associated with any tube configuration is the provision of a temperature measurement device. A preferred embodiment is the use of a Resistive Temperature Device (RTD) attached to a flow tube. If desired, the temperature can be measured using an infrared temperature measurement device. The benefits to this device is that it is non-contact and can be located off the tube, thereby reducing mass on the tube. Also, the RTD can be mounted to another flow carrying tube in the sensor which is not the vibrating flow tube.

Another embodiment comprises a massive base having upwardly extending sidewalls and a single flow tube extending through coaxial holes in the sidewalls. The base has an inner and an outer pair of upwardly extending walls. The inner walls contain the stationary vibrational nodes of the active portion of the flow tube; the outer walls mount connectors to which an inlet of the flow tube is connected at one end and an outlet of the flow tube is connected at the other end. This arrangement provides a dynamically unbalanced structure comprising a single flow tube with any vibrations at the nodes of the active portion of the flow tube being suppressed by the inner pair of upwardly extending walls.

Still another embodiment of the invention comprises a massive base having upwardly extending side walls and a pair of flow tubes extending through holes in the side walls. The two flow tubes are connected in series in so far as concerns the process material flow. This connection is accomplished by means of short u-shaped length of PFA tubing at one end of the base. This short u-shaped length of tubing connects an outlet end of the first flow tube to an inlet end of the second flow tube which is positioned in the base parallel to the first flow tube. With this arrangement, an inlet end of the first flow tube and an outlet end of the second flow tube are positioned in the same upwardly extending wall of the massive base. The two flow tubes are vibrated by separate drivers in phase opposition. Each flow tube also has its pair of pickoffs for detecting the Coriolis response of its flow tube with material flow.

In summary, the Coriolis flowmeter embodying the present invention is advantageous in that it provides for the measurement and delivery of a process material having an ultra high level of purity. This level of purity is provided by the use of a PFA plastic flow tube which is superior to metals, glass and ordinary plastics all of which permit ion transfer from the flow tube material to the processed material. The processed material may typically comprise a slurry which is an organic compound used as a polishing agent in the fabrication of wafers in the semi-conductor industry. This polishing operation provides a flat surface for the wafers. The polishing operation can take about an hour during which time the slurry must be free from any contaminants. The deposit of a single undesired ion onto a semi-conductor wafer can short circuit all or a portion of the wafer and render it useless.

ASPECTS

An aspect of the invention is a Coriolis flowmeter for measuring a process material flow having an ultra high level of purity, said Coriolis flowmeter comprising:
a base;
flow tube apparatus adapted to receive said process material flow, said flow tube apparatus is formed of a material that does not transfer ions from said flow tube apparatus to said process material;
end portions of said flow tube apparatus are coupled to said base to create substantially stationary nodes at said end portions;
said flow tube apparatus has high flexibility and also has a stiffness substantially lower than flow tube apparatus formed of metal or glass;
a driver coupled to said flow tube apparatus for vibrating said flow tube apparatus containing said process material flow;
pickoff means coupled signalwise to said flow tube apparatus for generating signals representing induced Coriolis deflections of said vibrating process material filled flow tube apparatus; and
meter electronics that receives said signals from said pickoff means and generates output information pertaining to said process material flow.
Preferably said flow tube apparatus defines a substantially straight single flow tube.
Preferably the entirety of the wetted flow path of said Coriolis flowmeter comprises a PFA substance.
Preferably said flow tube apparatus defines more than one flow tube.
Preferably said pickoff means is an electro-magnetic device having a magnet connected to said flow tube apparatus and further having a coil.
Preferably said pickoff means comprises a light source and an optical detector;
said vibrating flow tube apparatus is positioned between said light source and said optical detector to alter the characteristics of the light received by said optical detector from said light source;
said optical detector is responsive to said alteration to generate said signals representing said Coriolis deflections.
Preferably said base has a lower surface and an inner pair of upwardly extending side walls as well as an outer pair of upwardly ending walls;
openings in each of said upwardly extending walls are coaxially aligned to receive said flow tube apparatus.
Preferably said base is substantially u-shaped and has a lower surface and a pair of upwardly extending walls proximate sides of said base;
openings in each of said upwardly extending walls are coaxially aligned to receive said flow tube apparatus.
Preferably ends of said flow tube apparatus extend beyond said walls.
Preferably said base is a solid rectangular element defining a parallelepiped;
said flow tube apparatus is connected to posts affixed between said walls to a top surface of said base.
Preferably an inlet of said flow tube apparatus receives said process material flow from a supply tube;
an outlet of said flow tube apparatus is coupled to an inlet of a return tube;
said return tube is coupled to said base and is positioned parallel to said flow tube apparatus and extends through walls of said base, and
said return tube is adapted to be connected to an exit tube to extend said process material flow towards a user application.
Preferably said flow tube apparatus comprises a single flow tube and that said base has a mass substantially greater than the mass of said flow tube with process material.
Preferably the mass of said base is at least 1000 times the mass of said single flow tube with process material.
Preferably the mass of said base is at least 100 times the mass of said single flow tube with process material.
Preferably said driver is affixed to the top of said single flow tube when in use.
Preferably a dynamic balancer means coupled to said base proximate said nodes to maintain said nodes at a reduced level of vibration.
Preferably said dynamic balancer means is an active dynamic balancer controlled by the exchange of signals with said meter electronics.
Preferably said base is substantially u-shaped and has a lower surface and a pair of upwardly extending side walls containing coaxially aligned openings for receiving said single flow tube.
Preferably said single flow tube extends through coaxial openings in said walls.
Preferably said flow tube apparatus comprises a first and a second flow tube coupled to said base and positioned parallel to each other, said first and second flow tubes are adapted to be vibrated in phase opposition by said driver.
Preferably said driver is affixed to both said first flow tube and said second flow tube and is adapted to vibrate said first and second flow tubes in phase opposition;
said pickoffs being affixed to both said first and second flow tubes to detect the Coriolis deflections of said first and second flow tubes.
Preferably said first and second flow tubes are connected in series with respect to said material flow.
Preferably said first and second flow tubes are connected in parallel with respect to said material flow.
Preferably a return tube coupled to said base and oriented parallel to said first and second flow tubes;
said return tube receives said process material flow from said first and second flow tubes and extends said material flow towards a user application.
Preferably said base is u-shaped and has upwardly extending walls;
said first and second flow tubes extend through said walls of said base and have inlet and outlet ends projecting beyond the outer surfaces of said walls.
Another aspect comprises a Coriolis flowmeter for measuring a flow of process material having an ultra high level of purity;
said Coriolis flowmeter comprising:
a single flow tube formed of a material, such as PEA, that does not transfer ions from said single flow tube to said process material;
said single flow tube has high flexibility and further has a stiffness substantially lower than a metal or glass flow tube;
the entirety of the wetted path of said Coriolis flowmeter comprises said PFA material;
a driver affixed to said single flow tube for vibrating said single flow tube containing said process material flow;

a massive base affixed to ends of said single flow tube to absorb undesired vibratory forces generated by said vibrating flow tube;

said base defines stationary nodes at ends of said flow tube;

an inlet connector connected to said massive base and adapted to receive a flow of said process material from a supply tube;

an inlet end of said single flow tube is affixed to said inlet connector;

said input connector sealably connects said inlet end of said single flow tube to an outlet end of said supply tube to effect the extension of said process material flow in said supply tube to said single flow tube;

said inlet connector maintains said inlet end of said flow tube fixed with respect to said massive base;

an outlet end of said single flow tube affixed to a second connector for extending said process material flow via an exit tube towards a user destination;

a pair of pickoffs coupled to said single flow tube on opposite sides of said driver for generating signals representing Coriolis induced deflections of said vibrating material filled single flow tube;

meter electronics; and conductors extending signals from said pickoffs to said meter electronics;

said meter electronics receives said pickoff output signals and generates output information pertaining to said process material flow.

Preferably a return tube connected to said massive base parallel to said single flow tube;

end portions of said single flow tube and said return tube are glued to said massive base to maintain said single flow tube and said return tube immovable with respect to said massive base;

an inlet of said return tube;

an intermediate tube connecting said outlet end of said single flow tube and said inlet end of said return tube via said second connector to extend said process material flow from said outlet end of said single flow tube to said return tube;

an outlet connector connected to said massive base for receiving said flow of said process material from said outlet end of said return tube;

said outlet connector sealably connects said outlet end of said return tube to an inlet end of an exit tube to effect the extension of said process material flow in said return tube to said exit tube;

said exit tube is adapted to extend said process material flow to a user destination.

Preferably said pickoffs are electro-magnetic devices each having a magnet and a coil.

Preferably said pickoffs each comprises a light source and an optical detector with the magnitude of the Coriolis deflection of said single flow tube defining the magnitude of the output current of said optical detector.

Preferably said massive base has a pair of upwardly extending parallel side walls having coaxial openings through which said single flow tube and said return tube extend.

Preferably said massive base is substantially u-shaped.

Preferably said massive base is a solid rectangular element defining a parallelepiped;

said single flow tube is mounted to upwardly extending posts affixed to a surface of said massive base.

Preferably ends of said single flow tube and said return tube extend beyond the outer surface of each leg.

Preferably said single flow tube is substantially straight.

Preferably Coriolis flowmeter comprises a second flow tube coupled to said massive base to define a dynamically balanced structure when vibrated by said driver while containing said process material.

Preferably said driver is positioned when in use on a top surface of said single flow tube.

Preferably a dynamic balancer means coupled to said massive base proximate said nodes to reduce the vibration of said nodes.

Preferably said dynamic balancer means is an active dynamic balancer controlled by the exchange of signals with said meter electronics.

Preferably said first and second flow tubes have an irregular shape.

Preferably the mass of said massive base is at least 100 times the mass of said flow tube with material flow.

Preferably the mass of said massive base is at least 1000 times the mass of said single flow tube with material flow.

Preferably said driver vibrates said flow tube at a resonant frequency of said material filled flow tube.

Preferably said driver vibrates said flow tube at a non resonant frequency of said material filled flow tube.

Preferably said Coriolis flowmeter is adapted to extend a flow of corrosive material including nitric acid.

DESCRIPTION OF THE DRAWINGS

These and other advantages and features of the present invention may be better understood in connection with a reading of the following detailed description thereof in connection of the drawings in which.

DETAILED DESCRIPTION

Figure 1:
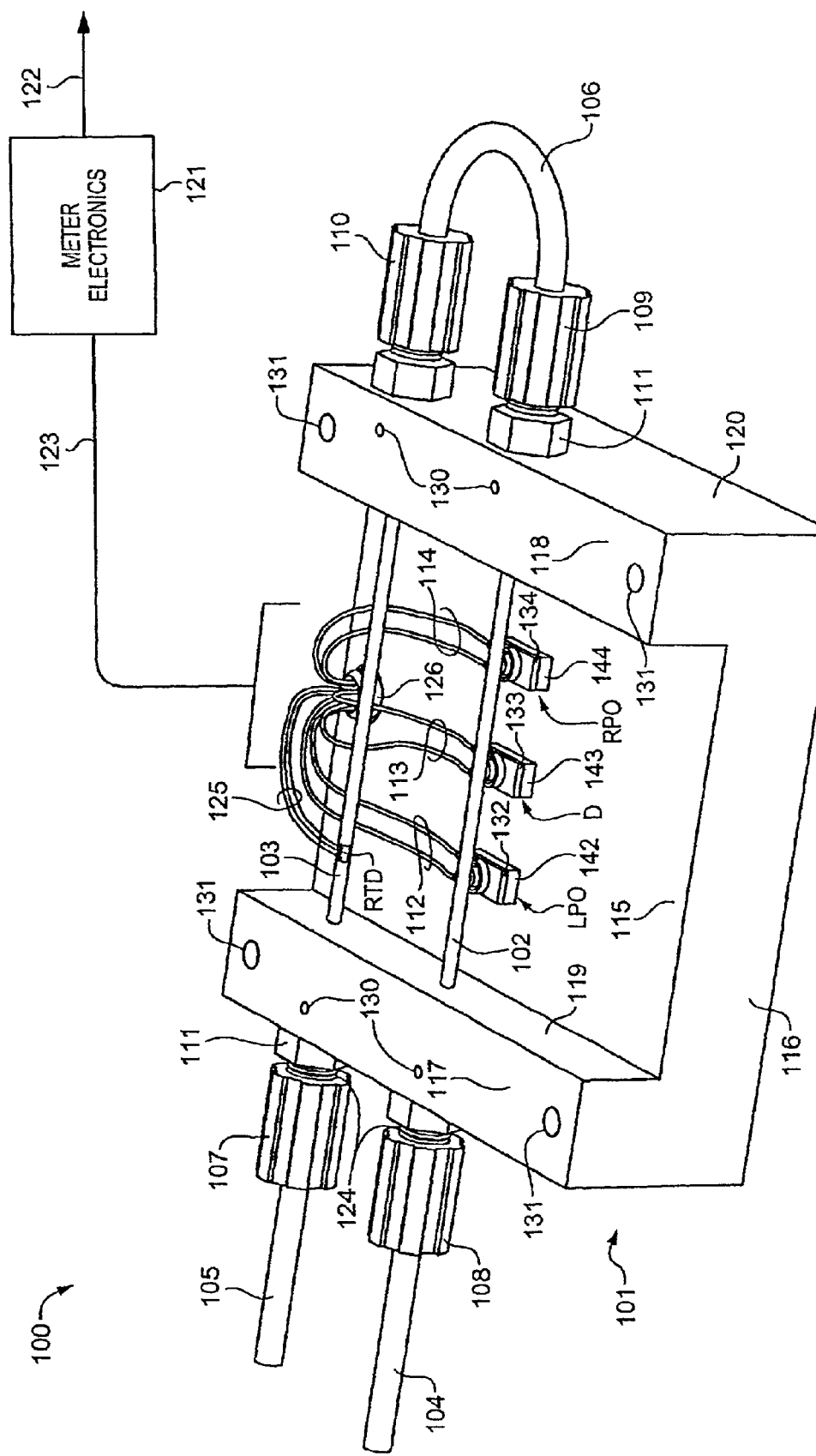
FIG. 1 discloses a perspective view of a first exemplary embodiment of the invention.

Description of FIG. 1

FIG. 1 is a perspective view of a first possible exemplary embodiment of the invention and discloses a flowmeter 100 having a flow tube 102 inserted through legs 117, 118 of base 101. Flowmeter 200 has a base 101, sidewalls 119 and 120, a front surface 116 and top wall surfaces 117 and 118.

Pickoffs LP0 and RP0 and driver D are coupled to flow tube 102. Flowmeter 100 receives a process material flow from supply tube 104 and extends the flow through connector 108 to flow tube 102. Flow tube 102 is vibrated at its resonant frequency with material flow by driver D. The resulting Coriolis deflections are detected by pickoffs LP0 and RP0 which apply signals over conductors 112 and 114 to meter electronics 121. Meter electronics 121 receives the pickoff signals, determines the phase difference between them, determines the frequency of oscillation and applies output information pertaining to the material flow over output path 122 to a utilization circuit not shown. The material flow passes from flow tube 102 and through tube 106 which redirects the material flow through return tube 103 through connector 107 to exit tube 105 which delivers the material flow to a user application. This user application may be a semiconductor processing facility. The process material may be a semiconductor slurry which is applied to the surface of a semiconductor wafer to form a flat surface. The PFA material used in the flow tubes shown on FIG. 1 ensures that the process material is free of impurities such as ions which could be transferred from the walls of metals or glass flow tubes. Locking holes 130 receive set screws 411 to fixably connect element 111 to base 101 as shown on FIG. 4.

In use, flow tube 102 is of a narrow diameter approximating one half that of a soda straw, but with thicker walls and of negligible weight such as, for example, 0.8 gram plus 0.5 gram for the process material. This excludes the weight of the magnets. The magnets associated with the pickoffs and driver have a mass of 0.2 gram each so that the combined mass of the flow tube 102, the affixed magnets and the process material is approximately 2 grams. Vibrating flow tube 102 is a dynamically unbalanced structure. Base 102 is massive and weighs approximately 12 pounds. This provides a ratio of the mass of the base to that of a material filled flow tube of approximately 3000. A base of this mass is sufficient to absorb vibrations generated by the dynamically unbalanced flow tube 102 with material flow.

Connectors 107, 108, 109 and 110 connect tubes 104, 105 and intermediate tube 106 to the ends of flow tube 102 and return tube 103. These connectors are shown in detail in FIG. 4. The connectors have a fixed portion 111 that includes threads 124. The movable portion of connectors 107 through 110 are threaded onto male threads 124 to connect their respective tubes to the fixed body of the connector of which the fixed portion 111 is a part. These connectors function in a manner similar to the well known copper tubing flared connectors to connect tubes 104, 105 and 106 to ends of flow tube 102 and return tube 103. Details regarding the connectors are further shown in FIG. 4. RTD is a temperature sensor that detects the temperature of return tube 103 and transmits signals representing the detected temperature over path 125 to meter electronics.

Figure 2:
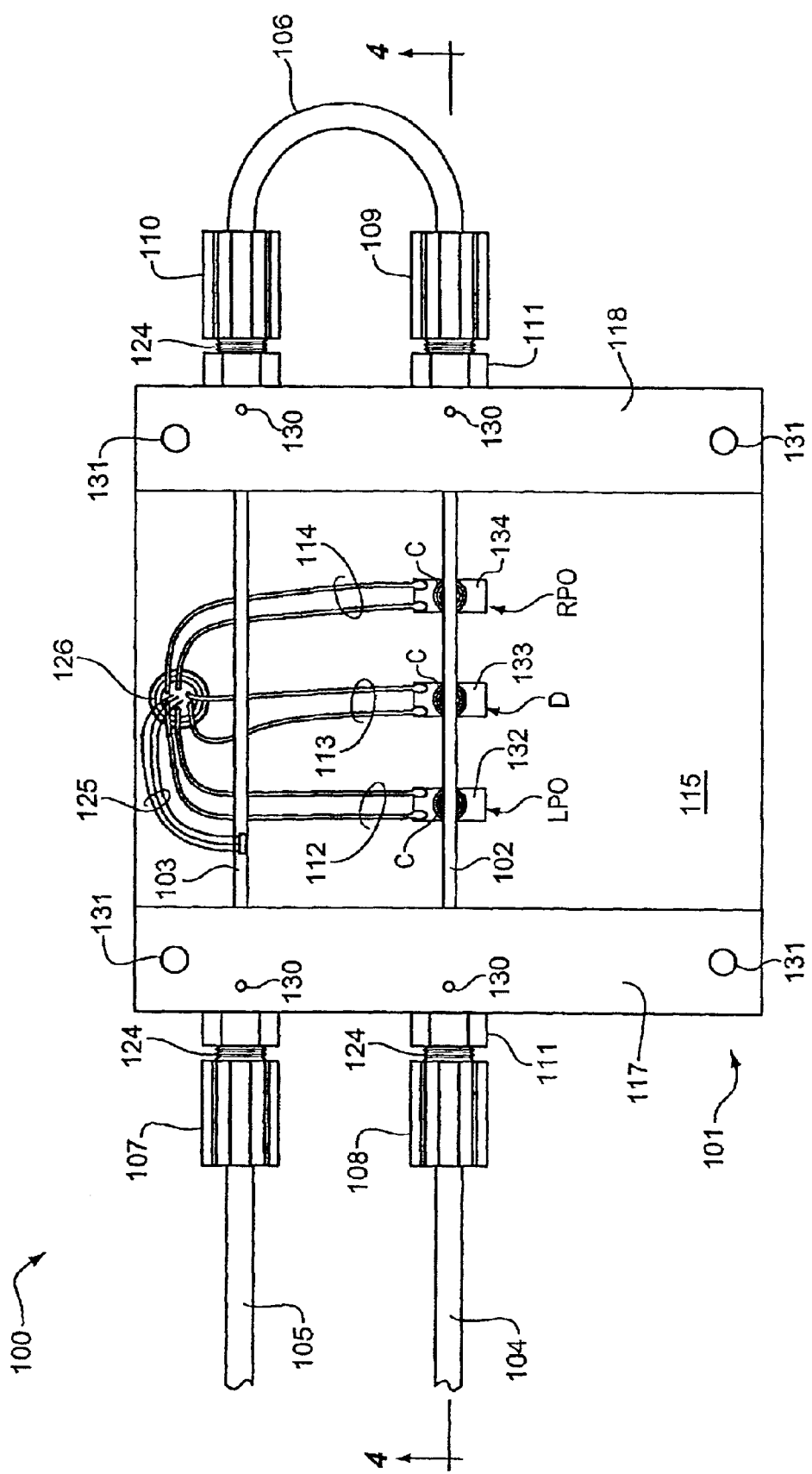
FIG. 2 is a top view of the embodiment of FIG. 1.

Description of FIG. 2

Figure 3:
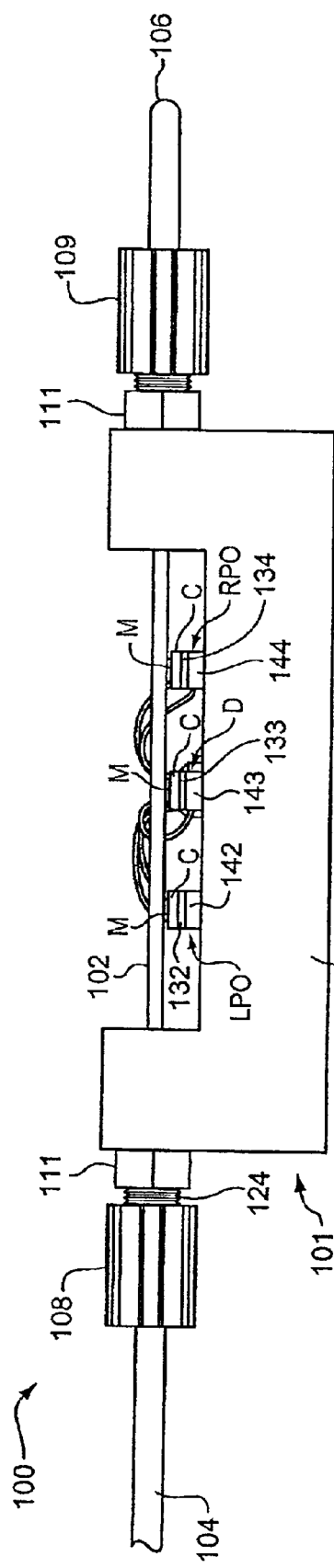
FIG. 3 is a front view of the embodiment of FIG. 1.

In FIG. 2 is a top view of flowmeter 100 of FIG. 1. Pickoffs LP0 and RP0 and driver D each include a coil C. Each of these elements further includes a magnet which is affixed to the bottom portion of flow tube 102 as shown in FIG. 3. Each of these elements further includes a base, such as 143 for driver D, as well as a thin strip of material, such as 133 for driver D. The thin strip of material may comprise a printed wiring board to which coil C and its winding terminals are affixed. Pickoffs LP0 and RP0 also have a corresponding base element and a thin strip fixed to the top of the base element. This arrangement facilitates the mounting of a driver or a pickoff to be accomplished by the steps of gluing a magnet M to the underside of PFA flow tube, gluing the coil C to a printed wiring board 133 (for driver D), positioning the opening in coil C around the magnet M, moving the coil C upwardly so that the magnet M fully enters the opening in coil C, then positioning base element 143 underneath the printed wiring board 133 and gluing or bolting these elements together so that the bottom of base 143 is affixed by glue to the surface of the massive base 101.

The male threads 124 of connectors 107–110 are shown on FIG. 2. The inner details of each of these elements is shown on FIG. 4. Opening 132 receives conductors 112, 113 and 114. Meter electronics 121 of FIG. 1 is not shown on FIG. 2 to minimize drawing complexity. However it is to be understood that the conductors 112, 113 and 114 extend through opening 126 and further extend over path 123 of FIG. 1 to meter electronics 121 of FIG. 1.

Description of FIG. 3

FIG. 3 shows pickoffs LP0, RP0 and driver D as comprising a magnet M affixed to the bottom portion of flow tube 102 and a coil C affixed to the base of each of elements LP0, RP0 and driver D.

Figure 4:
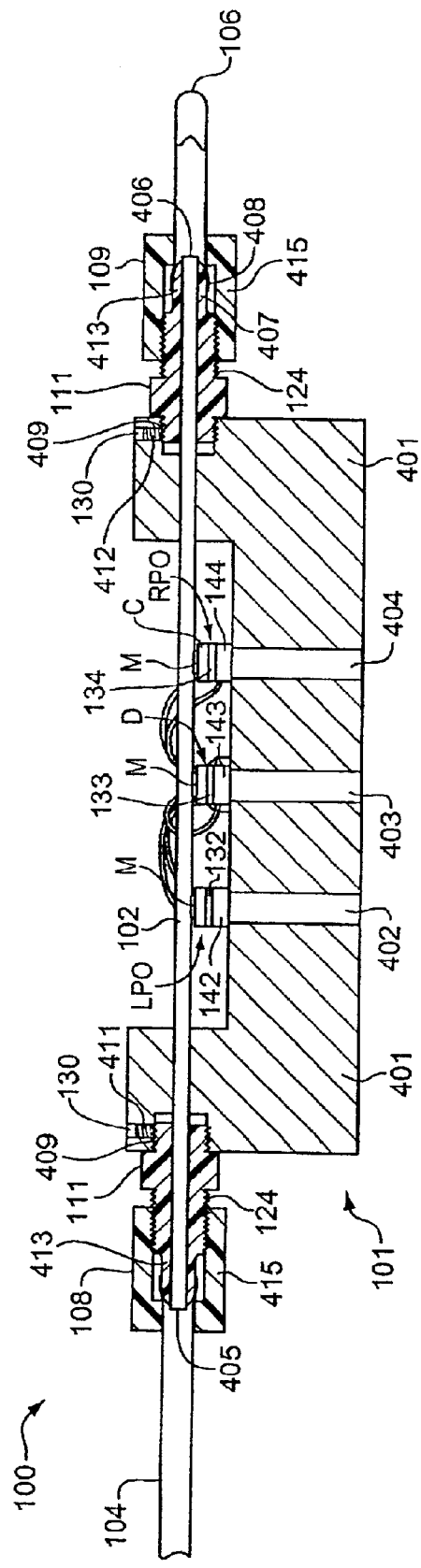
FIG. 4 is a cross-sectional view taken along lines 4—4 of FIG. 2.

Description of FIG. 4

FIG. 4 is a sectional taken along line 4—4 of FIG. 2. FIG. 4 discloses all the elements of FIG. 3 and further details of connectors 108 and 109. FIG. 4 further discloses openings 402, 403 and 404 in base 101. The top of each of these openings extends to the lower surface of the base of pickoffs LP0, RP0 and driver D. The coil C and magnet M associated with each of these elements is also shown on FIG. 4. Meter electronics 121 of FIG. 1 is not shown on FIGS. 3 and 4 to minimize drawing complexity. Element 405 in connector 108 is the inlet of flow tube 102; element 406 in connector 109 is the outlet of flow tube 102.

The fixed portion 111 of connector 108 includes male threads 409 which screw into mating threads in base 401 to attach fixed connector portion 111 to segment 401 of base 101. The fixed body of connector 109 on the right is similarly equipped and attached by threads 409 to element 401 of base 101. Fixed portion 111 of connector 108 further includes a threaded portion 124 whose threads receive the movable portion 415 of connector 108. Connector 109 is similarly equipped. Fixed portion 111 of connector 108 further includes on its left a conical stub 413 which together with movable element 415 acts as a flare fitting to force the right end of input tube 104 over the conical stub 413 of fixed portion 111. This creates a compression fitting that sealably affixes the flared opening of supply tube 104 onto the conical stub portion 413 of fixed portion 111 of the connector. The inlet of flow tube 102 is positioned in connector fixed portion 111 and is flush with the outer surface of stub 413. By this means, the process material delivered by supply tube 104 is received by inlet 405 of flow tube 102. The process material flows to the right through flow tube 102 to fixed portion 111 of connector 109 where the outlet 406 of flow tube 102 is flush with the end of connector stub 413. This sealably affixes the outlet of tube 102 to connector 109. The other connectors 107 and 110 of FIG. 1 are identical to those described for the details of connectors 108 and 109 on FIG. 4.

Figure 5:
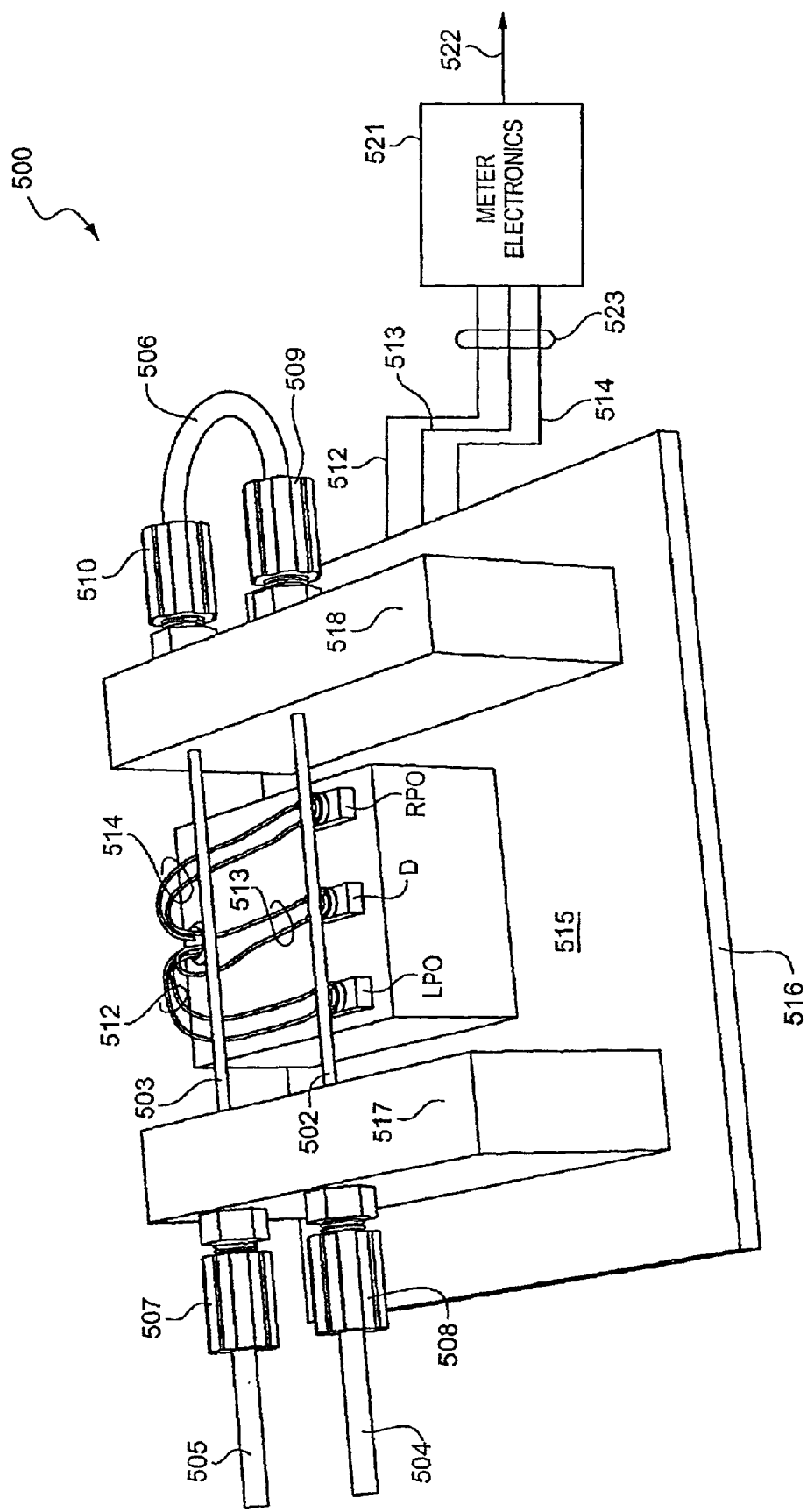
FIG. 5 is a perspective view of an alternative embodiment having a pair of base elements.

Description of FIG. 5

FIG. 5 discloses flowmeter 500 as an alternative embodiment of the invention similar to that of FIG. 1 except that the base of the flowmeter 500 is not a single element and comprises separate structures 517 and 518. Flow tube 502 and return tube 503 extend through the elements 517, 518 to connectors 507 through 510 which are comparable in every respect to connectors 107 through 110 of FIG. 1. Flowmeter base elements 517, 518 are separate and each is of sufficient mass to minimize the vibrations imparted by driver D to the dynamically unbalanced structure comprising flow tube 502. Base elements 517 and 518 rest on surface 515 of element 516 which supports base elements 517 and 518.

All elements shown on FIG. 5 operate in the same manner as do their corresponding elements on FIG. 1. This correspondence is shown by the designation of each element which differs only in that the first digit of the part designation of the element. Thus, supply tube 104 on FIG. 1 corresponds to supply tube 504 on FIG. 5.

Figure 6:
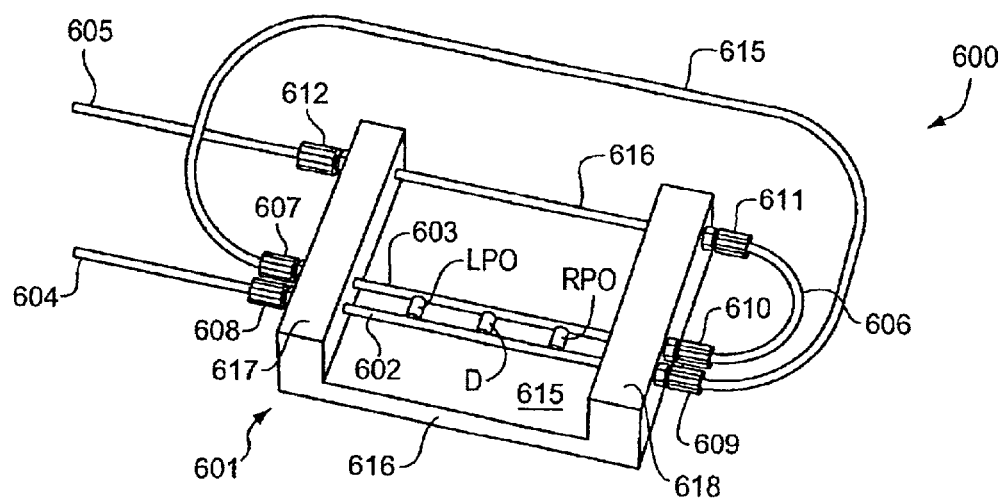
FIG. 6 discloses a dynamically balanced flowmeter having a U-shaped base.

Description of FIG. 6

FIG. 6 discloses yet another alternative embodiment of the invention as comprising flowmeter 600 which is different from the embodiment of FIG. 1 in that flowmeter 600 has two active flow tube 602 and 603 which comprise a dynamically balanced structure that does not require the massive base such as base 101 of FIG. 1. Base 601 may have significantly less mass than that of FIG. 1. Flowmeter 600 has connectors 607 through 610 comparable to connectors 107–110 of FIG. 1. In addition, it has connectors 611, 612. Process material is received by flowmeter 600 from a supply tube 604. The material extends via a connector 608 to the left end of flow tube 602. Flow tube 602 extends through leg 618 of base 601 and connector 609 by means where it is connected to tube 615 which loops back via connector 607 to flow tube 603. Flow tube 603 is vibrated in phase opposition to flow tube 602 by driver D. The Coriolis response of the vibrating flow tubes 602 and 603 is detected by pickoffs LP0 and RP0 and transmitted via conductors not shown to meter electronics element also not shown to minimize drawing complexity.

The material flow through tube 603 proceeds to the right and extends via connector 610 to tube 606 which loops back through connector 611 and tube 616, connector 612 to return flow tube 605 which delivers the material flow to the application process of the end user.

Flowmeter 600 is advantageous in that it comprises a dynamically balanced structure of flow tubes 602 and 603 formed of PFA material. The dynamically balanced structure is advantageous in that the massive base 101 of FIG. 1 is not required. Base 601 may be of conventional mass and vibrating PFA tubes 602 and 603 to provide output information pertaining to the material flow. The PFA flow tubes ensure that the material flow have an ultra high level of purity.

Figure 7:
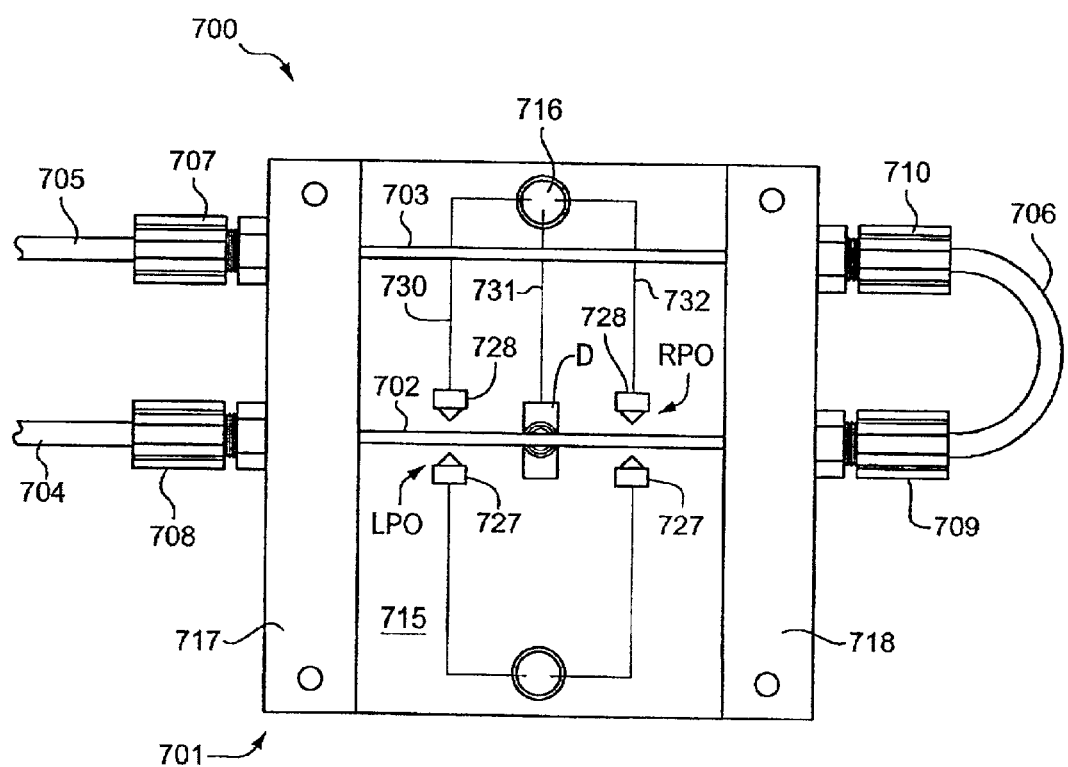
FIGS. 7 and 8 disclose a flowmeter having optical pickoffs.
Figure 8:
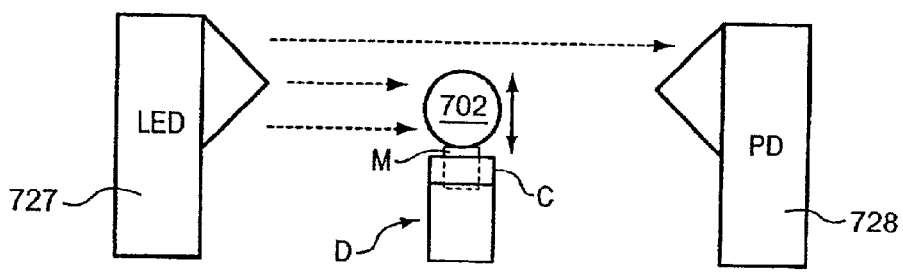

Description of FIGS. 7 AND 8

FIG. 7 discloses a top view of a flowmeter 700 comparable to flowmeter 100 of FIG. 1. The difference between the two embodiments is that flowmeter 700 uses an optical detector for pickoffs LP0 and RP0. The details of the optical detectors are shown in FIG. 8 as comprising a LED light source and photo-diode together with a flow tube 702 interposed between the LED and photo-diode. At the rest position of the flow tube, a nominal amount of light passes from the LED to the photo-diode to generate a nominal output signal. A downward movement of the flow tube increases the amount of light received by the photo-diode; an upward movement of the flow tube decreases the amount of light received by the photo-diode. The amount of light received by the photo-diode translates to an output current indicative of the magnitude of the Coriolis vibration for the portion of the flow tube 702 associated with the LED and the light source. The output of the photo-diodes are extended over conductors 730 and 732 to meter electronics not shown in FIG. 7 to minimize drawing complexity. The embodiment of FIG. 7 is otherwise identical in every respect to the embodiment of FIG. 1 and includes supply tubes 704, exit tube 705 together with connectors 707 through 710 flow tubes 702 and return tube 703. The parts of flowmeter 700 and their counterparts on FIG. 1 and are designated to facilitate the correspondence with the only difference being the first digit of the designation of each element.

Figure 9:
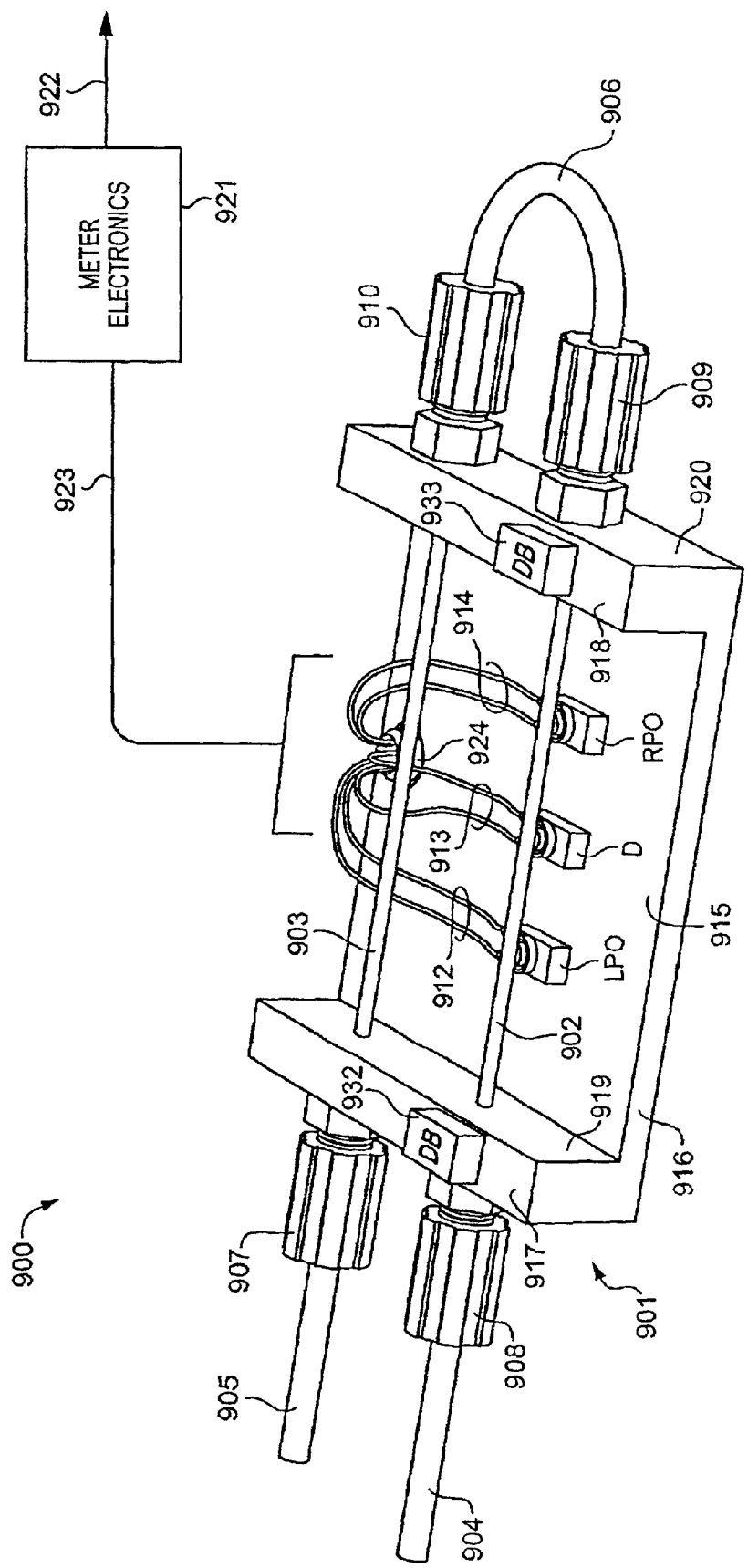
FIGS. 9 and 10 disclose flowmeters having dynamic balancers.

Description of FIG. 9

FIG. 9 discloses flowmeter 900 which corresponds to flowmeter 100 of FIG. 1 except that flowmeter 900 is equipped with dynamic balancers 932 and 933. Base 901 is smaller and of less mass than 101 of FIG. 1. The dynamic balancers function to counteract the vibrations imparted to legs 917 and 918 of base 901 by the dynamically unbalanced structure comprising the material filled vibrating flow tube 902. In the embodiment of FIG. 1, these vibrations are absorbed by the massive base 101. In this embodiment, the material filled flow tube with the attached magnets weigh approximately 2 grams while the base weighs approximately 12 pounds. This limits the range of commercial applications for which the flow tube of FIG. 1 since the upper limit on the size and mass of the material filled vibrating flow tube 102 is limited by the mass of the base that must be provided to absorb unbalanced vibrations. Using the 3,000 to 1 ratio between the mass of the base and the mass of the material filled vibrating flow tube, an increase of one pound in the mass of the material filled flow tube would require an increase of mass of 3,000 pounds for base 101. This clearly limits the range of commercial applications in which the flow tube 100 of FIG. 1.

Flowmeter 900 of FIG. 9 has a wider range of commercial applications since the dynamic balancers 932 and 933 are affixed to legs 917 and 918 to absorb much of the vibrations imparted to the legs by the dynamically unbalanced vibrating flow tube 902. In practice, dynamic balancers (DB) may be of any type including the conventional mass and spring configuration as is well known in the art of dynamic balancers.

Figure 10:
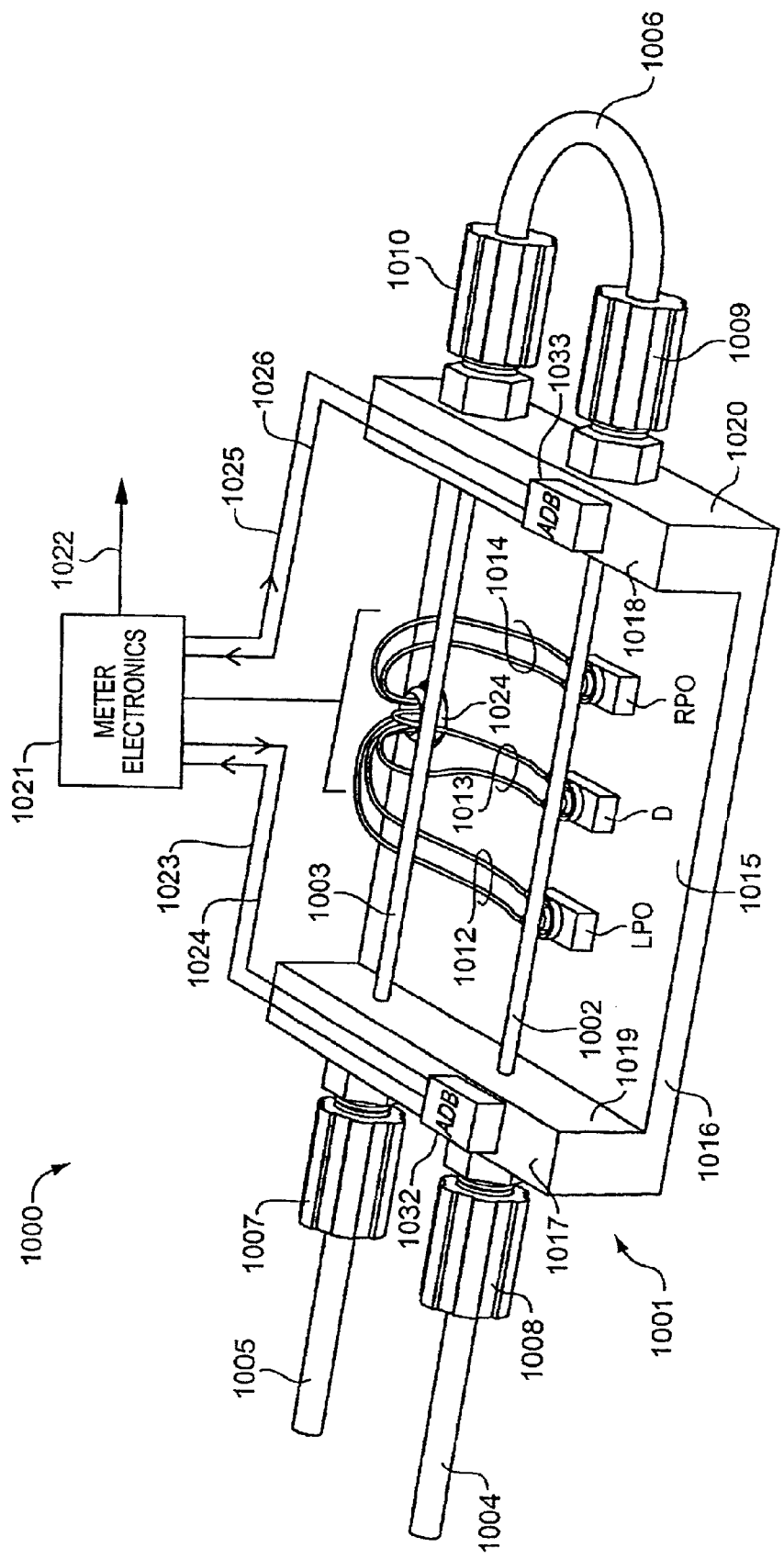

Description of FIG. 10

FIG. 10 discloses a flowmeter 1000 that is identical to flowmeter 900 except that the dynamic balancers of FIG. 10 are of the active type (ADB) and are designated 1032 and 1033. These active dynamic balancers are controlled by an exchange of signals with meter electronics 1021 over paths 1023, 1024, 1025 and 1026. Meter electronics 1021 receives signals over path 1003 from active dynamic balancer 1032 representing the vibrations applied by the dynamically unbalanced vibrating flow tube 1002 to leg 117. Meter electronics receive these signals and generates a control signal that is applied over path 1024 to active dynamic balancer 1032 to counteract the flow tube vibrations. Operating in this manner, active dynamic balancer 1032 can be controlled to reduce the vibrations of leg 1017 to whatever magnitude may be desired so hat the resulting mass of base 1001 may be of an acceptable level for commercial use of flowmeter 1000. The active dynamic balancer 1033 mounted atop leg 1018 of base 1001 operates in the same manner as described for the active dynamic balancer mounted to leg 1017.

Figure 11:
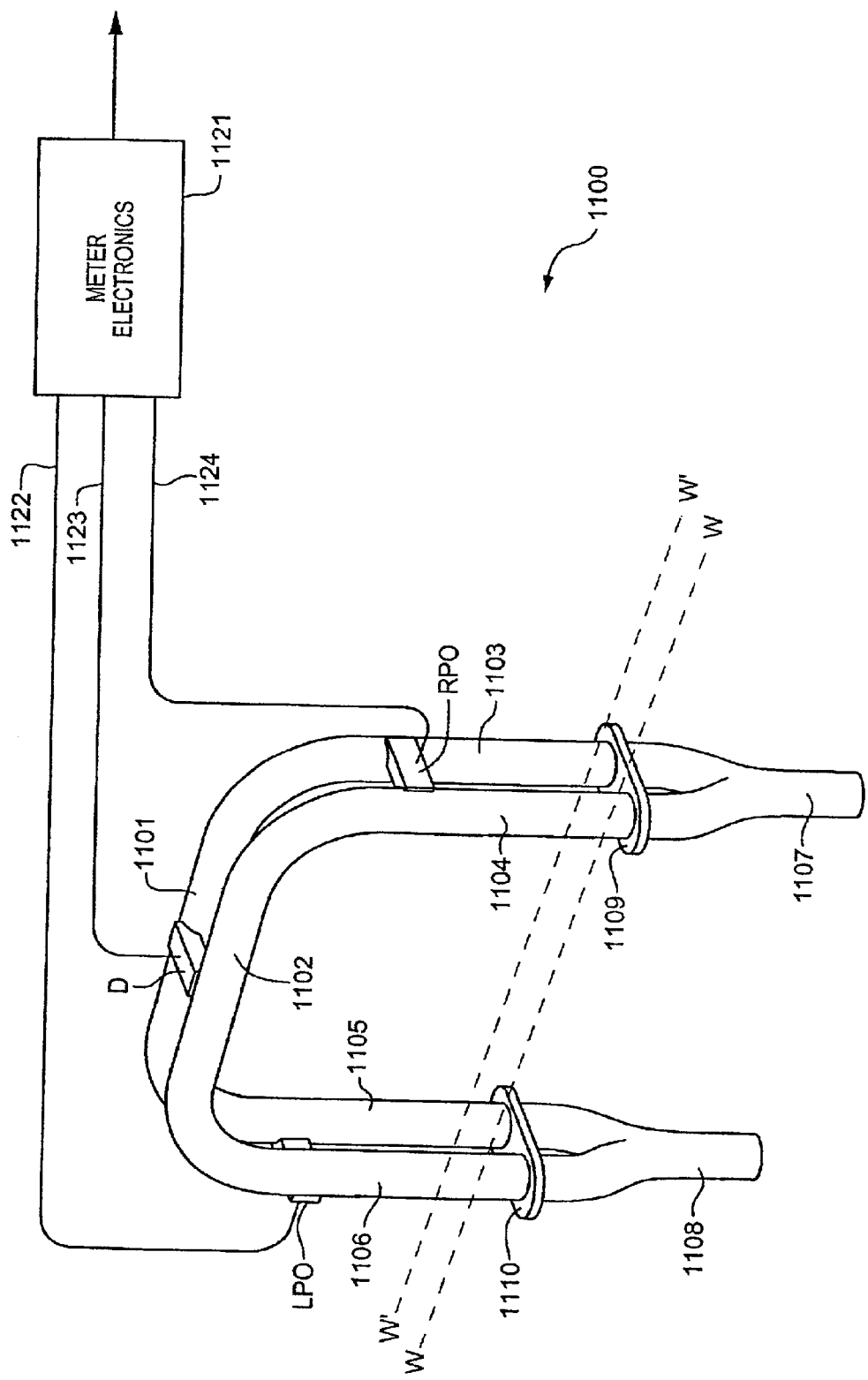
FIG. 11 discloses a flowmeter having a pair of substantially U-shaped flow tubes.

Description of FIG. 11

FIG. 11 discloses yet another alternative embodiment comprising a flowmeter 1100 having dual flow tubes 1101, 1102 which are substantially U-Shaped and have right side legs 1103, 1104 and left side legs 1105,1106. The bottom portion of the side legs are connected to form "Y" sections 1107 and 1108 which may be connected to a suitable base not shown to minimize drawing complexity. The dual flow tubes of flowmeter 1100 vibrate as dynamically balanced elements around the axes W-W and W'-W' of brace bars 1009 and 1010. Flow tubes 1101, 1102 are driven in phase opposition by driver D affixed to the top portion of the U-shaped flow tubes. The Coriolis deflections imparted by the vibrating material filled flow tubes are detected by right pickoff RP0 and left pickoff LP0. Meter electronics 1121 functions to apply signals over path 1123 to cause driver D to vibrate flow tubes 1101, 1102 in phase opposition. The Coriolis response detected by pickoffs LP0 and RP0 as transmitted over paths 1122,1124 to meter electronics 1121 which processes the signals and derives material flow information which is transmitted over output path 1124 to a utilizations circuit not shown.

Figure 12:
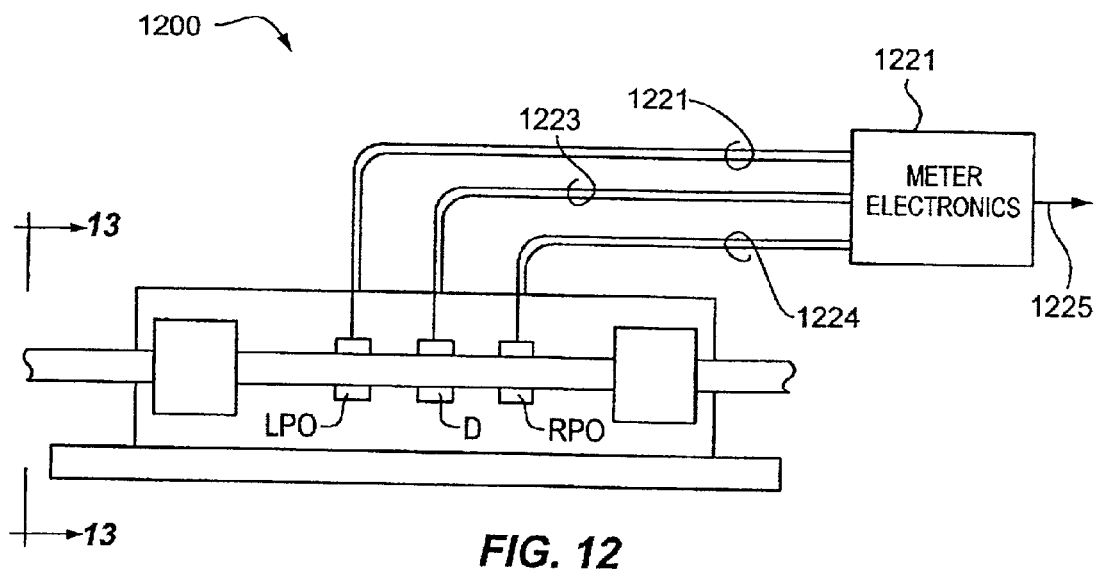
FIGS. 12 and 13 discloses another embodiment of a flowmeter having a pair of dynamically balanced straight flow tubes.
Figure 13:
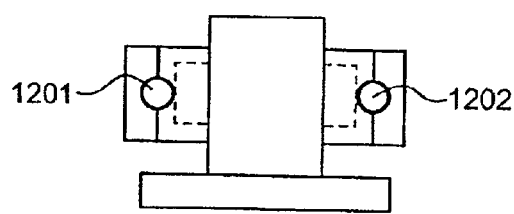

Description of FIGS. 12 and 13

FIGS. 12 and 13 disclose a dynamically balanced flowmeter 1200 having a pair of flow tubes 1201 and 1202 which are vibrated in phase opposition by driver D. The flow tubes receive a material flow; driver D vibrates the flow tubes in phase opposition in response to a drive signal received over path 1223 from meter electronics 1221. The Coriolis response of the material filled vibrating flow tubes is detected by pickoffs LP0 and RP0 with their output being applied over conductors 1221 and 1224 to meter electronics which processes the received signals to generate material flow information that is applied over output path 1225 to a utilization circuit not shown.

Figure 14:
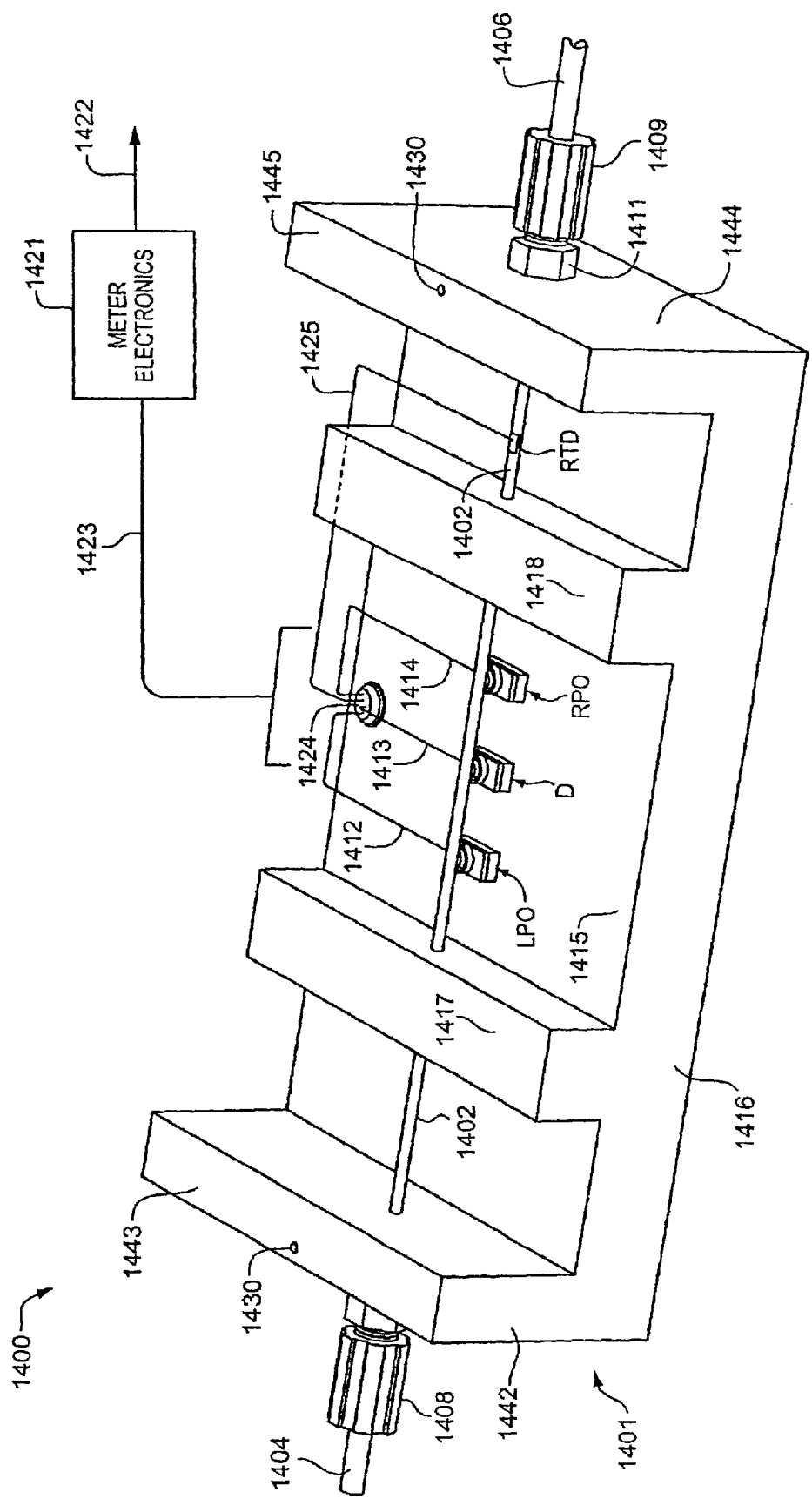
FIG. 14 discloses an alternative embodiment having a single flow tube and no return tube.

Description of FIG. 14

FIG. 14 discloses an alternative embodiment 1400 of the invention comprising a massive base 1401 having an outer pair of upwardly extending sidewalls 1443 and 1445 as well as an inner pair of upwardly extending sidewalls 1417 and 1418. A single flow tube 1402 extends from an input connector 1408 on the left through the four upwardly extending sidewalls to an output connector 1409 on the right. The flow tube 1402 is vibrated by driver D with the resulting Coriolis deflections of the vibrating flow tube with material flow being detected by pickoffs LP0 and RP0 which transmit signals over the indicated paths to meter electronics 1421 which functions in the same manner as priorly described or FIG. 1. Temperature sensing element RTD senses the temperature of the material filled flow tube and transmits this information over path 1425 to meter electronics 1421.

The flowmeter of FIG. 14 differs from that of FIG. 1 in two notable respects. The first is that the embodiment of FIG. 14 is only a single flow tube 1402. The material flow extends through this flow tube from input connector 1408; the output of the flow tube is applied via output connector 1409 to output tube 1406 for delivery to a user. The embodiment of FIG. 14 does not have the return flow tube comparable to element 103 of FIG. 1.

Also, the massive base 1401 has two pairs of upwardly extending walls whereas in the embodiment of FIG. 1 the massive base 101 had only the single pair of upwardly extending walls 117 and 118. The single pair of walls in FIG. 1 performed the function of being a zero motion vibrational node as well as a mounting for connectors 107 through 110. On FIG. 14, the inner pair of walls 1417 and 1418 function as a zero motion vibrational node for the ends of the active portion of flow tube 102. The outer pair of upwardly extending walls 1443 and 1444 mount connectors 1408 on the left and 1409 on the right.

When in use, process material is received from tube 1404 connected to connector 1408. The inlet of flow tube 1402 is also connected to connector 1408. Flow tube 1402 extends the process material flow to the right through the two pairs of sidewalls to output connector 1409 to which is connected the output tube 1406.

The part numbers on FIG. 14 not specifically mentioned immediately above are analogous to and perform the functions identical to their corresponding elements on the previous FIGS. including FIG. 1.

Figure 15:
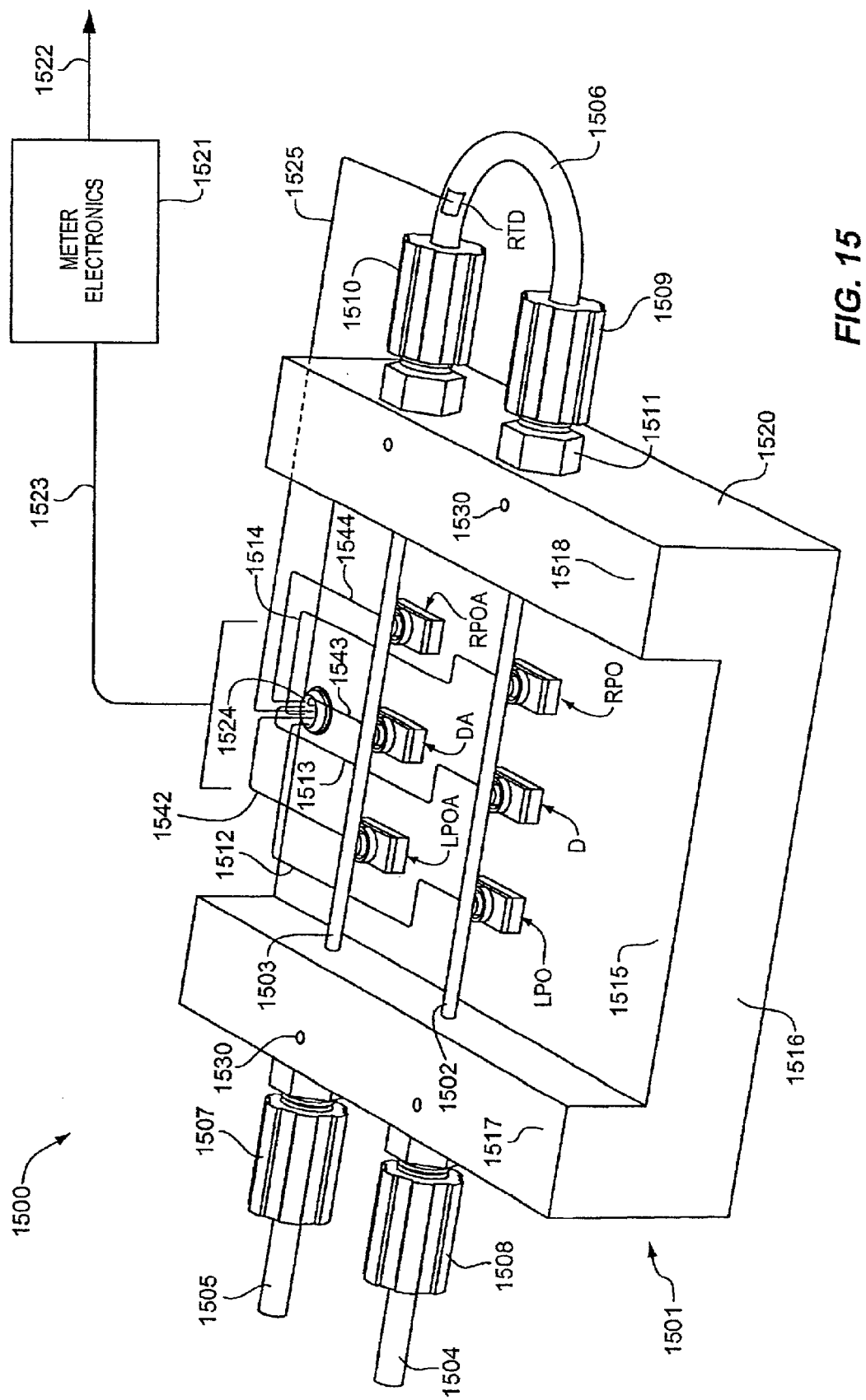
FIG. 15 discloses an alternative embodiment having two flow tubes vibrated in phase opposition.

Description of FIG. 15

FIG. 15 discloses an alternative embodiment 1500 which is similar in most respects to the embodiment of FIG. 1. The primary difference is that in the embodiment of 1500, the rear flow tube 1503 is not dormant as is return tube 103 of the embodiment of FIG. 1. Instead, on FIG. 15, rear tube 1503 is vibrated by its driver DA with the resulting Coriolis deflections of this vibrating tube with material flow being detected by its pickoffs LP0A and RP0A. Their output signals are transmitted over paths 1542 and 1544 to meter electronics 1521 which receives these signals as well as signals from pickoffs LP0 and RP0 of flow tube 1502 to generate material flow information.

The process material flows to right on FIG. 15 through flow tube 1502, through tube 1500 and flows to the left through flow tube 1503. This phase reversal of mated pickoffs can be compensated by reversing the connections to pickoffs LP0A and RP0A so that the Coriolis signals from all pickoffs received by meter electronics 1521 are additive to enhance meter sensitivity.

The parts shown on FIG. 15 not specifically mentioned above are identical in function to their corresponding elements on FIG. 15.

Figure 16:
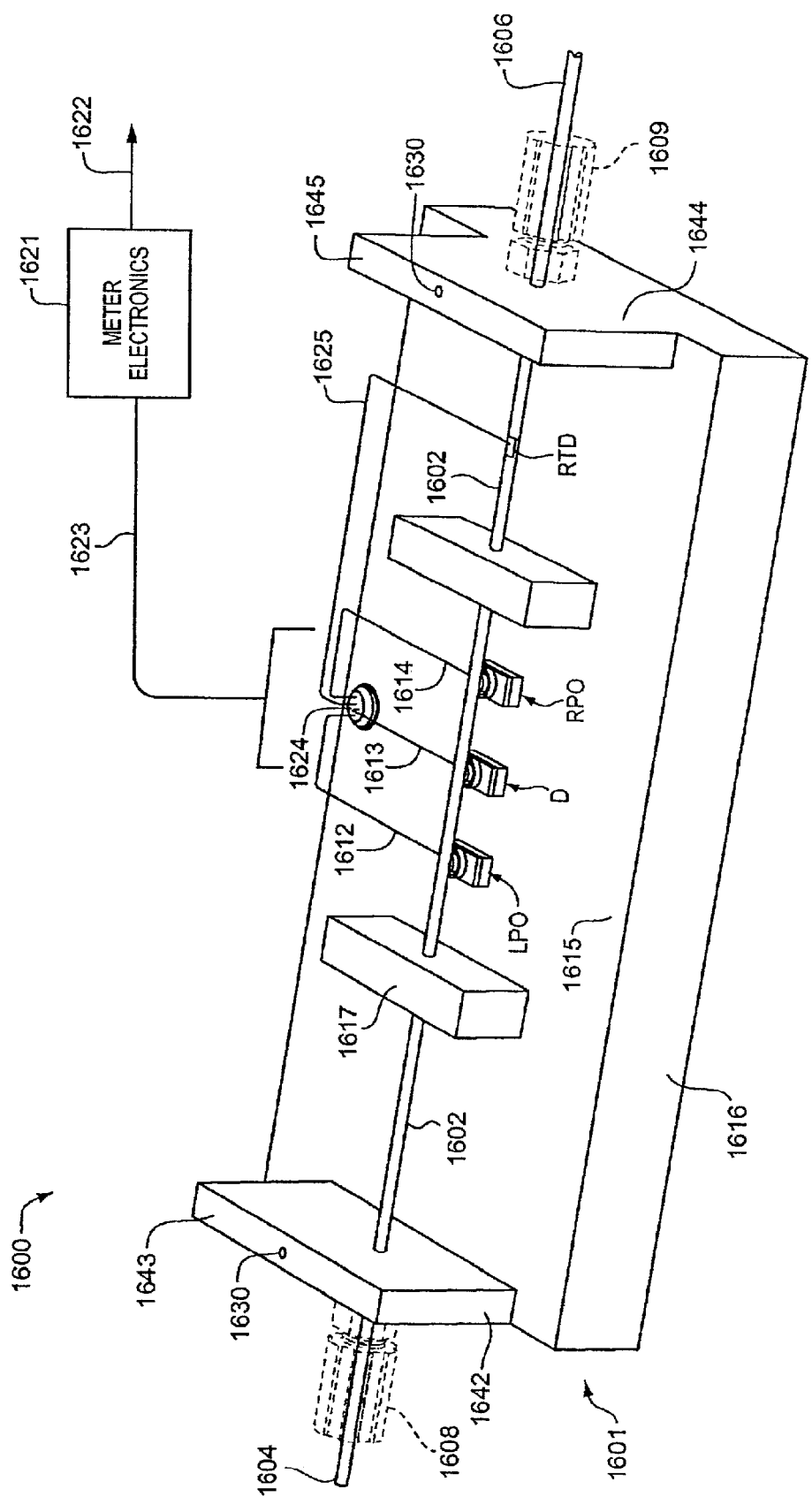
FIG. 16 discloses an alternative embodiment having a single flow tube.

Description of FIG. 16

FIG. 16 discloses an alternative embodiment 1600 that is similar to the embodiment of FIG. 14. It has a base 1601, front surface 1616, sidewalls 1644 and 1641 and front wall surfaces 1644. The differences are that upwardly extending inner mounting posts 1617 and 1618 replace walls 1417 and 1418 of FIG. 14. Also upwardly extending outer mounting posts 1643 and 1645 replace walls 1443 and 1445 of FIG. 14. Outer posts 1643 and 1645 prevent flow tube 1602 from pivoting about post 1617 and 1618 as an axis. Connectors 1608 and 1609 are optional and if desired flow tube 1602 may extend outwardly through posts 1643 and 1645 and replace inlet tube 1604 and outlet tube 1402. The extended flow tube may be connected downstream and upstream by a user to the user's equipment. Posts 1443 and 1445 serve as a mounting for connector 1608 and 1609 when provided.

It is to be expressly understood that the claimed invention is not to be limited to the description of the preferred embodiment but encompasses other modifications and alterations within the scope and spirit of the inventive concept. For example, the flowmeter embodiments shown herein may be operated in an upside down orientation it is desired to have the driver D positioned on top of a vibrating flow tube to allow the driver heat to move upward away from the flow tube. This can better isolate the flow tube from thermal stress that might degrade the accuracy or the output data of the flowmeter. Also, the Coriolis flowmeter herein disclosed has applications other than those herein disclosed. For example the disclosed Coriolis flowmeter may be used in applications in which the flowing process material is corrosive, such as nitric acid, and incompatible for use with flow meters having a metal wetted flow path.

What is claimed:

1. A Coriolis flowmeter for measuring a process material flow having an ultra high level of purity, said Coriolis flowmeter comprising:

a base;

flow tube apparatus adapted to receive said process material flow, said flow tube apparatus is formed of a material, such as PFA, that does not transfer ions from said flow tube apparatus to said process material;

end portions of said flow tube apparatus coupled to said base to create substantially stationary nodes at said end portions;

a driver coupled to said flow tube apparatus for vibrating said flow tube apparatus containing said process material flow;

pickoff means coupled signalwise to said flow tube apparatus for generating signals representing induced Coriolis deflections of said vibrating process material filled flow tube apparatus; and meter electronics that receives said signals from said pickoff means and generates output information pertaining to said process material flow.

2. The Coriolis flowmeter of claim 1 characterized in that said flow tube apparatus defines a substantially straight single flow tube.

3. The Coriolis flowmeter of claim 1 characterized in that the entirety of the wetted flow path of said Coriolis flowmeter comprises a PFA substance.

4. The Coriolis flowmeter of claim 1 characterized in that said flow tube apparatus defines more than one flow tube.

5. The Coriolis flowmeter of claim 1 characterized in that said pickoff means is an electro-magnetic device having a magnet connected to said flow tube apparatus and further having a coil.

6. The Coriolis flowmeter of claim 1 characterized in that said pickoff apparatus comprises a light source that emits a beam and an optical detector that receives said beam, said beam is oriented substantially transverse to said flow tube;

said light source and said optical detector are spaced apart from said flow tube on opposite sides of said flow tube apparatus;

said flow tube apparatus is positioned between said light source and said optical detector to alter the characteristics of a light beam received by said optical detector from said light source, said optical detector is responsive to said alteration to generate said signals representing said Coriolis deflections.

7. The Coriolis flowmeter of claim 1 characterized in that said base has a lower surface and an inner pair of upwardly extending walls as well as an outer pair of upwardly extending walls parallel to said inner walls;

openings in each of said upwardly extending walls are coaxially aligned to receive said flow tube apparatus.

8. The Coriolis flowmeter of claim 1 characterized in that said base is substantially u-shaped and has a lower surface and a pair of upwardly extending walls proximate sides of said base;

openings in each of said upwardly extending walls are coaxially aligned to receive said flow tube apparatus.

9. The Coriolis flowmeter of claim 7 characterized in that said single flow tube extends through coaxial openings in said walls.

10. The Coriolis flowmeter of claim 1 characterized in that said base is a solid rectangular element defining a parallelepiped;

said flow tube apparatus is connected to posts affixed to said base between upwardly extending walls affixed to a top surface of said base.

11. The Coriolis flowmeter of claim 1 characterized in that:

an inlet of said flow tube apparatus receives said process material flow from a supply tube;

an outlet of said flow tube apparatus is coupled to an inlet of a return tube;

said return tube is coupled to said base and is positioned parallel to said flow tube apparatus and extends through walls of said base, and said return tube is adapted to be connected to an exit tube to extend said process material flow towards a user application.

12. The Coriolis flowmeter of claim 2 characterized in that said flow tube apparatus comprises said single flow tube and that said base has a mass substantially greater than the mass of said flow tube with process material.

13. The Coriolis flowmeter of claim 12 characterized in that the mass of said base is at least 1000 times the mass of said single flow tube with process material.

14. The Coriolis flowmeter of claim 12 characterized in that the mass of said base is at least 100 times the mass of said single flow tube with process material.

15. The Coriolis flowmeter of claim 12 in which said driver is affixed to the top of said single flow tube when in use.

16. The Coriolis flowmeter of claim 12 further comprising:

a dynamic balancer means coupled to said base proximate vibrational nodes of said flow tube to maintain said nodes at a reduced level of vibration.

17. The Coriolis flowmeter of claim 16 characterized in that said dynamic balancer means is an active dynamic balancer controlled by the exchange of signals with said meter electronics.

18. The Coriolis flowmeter of claim 12 characterized in that said base is substantially u-shaped and has a lower surface and a pair of upwardly extending walls containing coaxially aligned openings for receiving said single flow tube.

19. The Coriolis flowmeter of claim 18 characterized in that said single flow tube extends through said coaxial openings in said walls.

20. The Coriolis flowmeter of claim 1 characterized in that said flow tube apparatus comprises a first and a second flow tube coupled to said base and positioned parallel to each other, said first and second flow tubes are adapted to be vibrated in phase opposition by said driver.

21. The Coriolis flowmeter of claim 20 characterized in that:

said driver is affixed to both said first flow tube and said second flow tube;

said pickoff means being affixed to both said first and second flow tubes to detect the Coriolis deflections of said first and second flow tubes.

22. The Coriolis flowmeter of claim 20 characterized in that said first and second flow tubes are connected in series with respect to said material flow.

23. The Coriolis flowmeter of claim 20 characterized in that said first and second flow tubes are connected in parallel with respect to said material flow.

24. The Coriolis flowmeter of claim 20 further comprising:

a return tube coupled to said base and oriented parallel to said first and second flow tubes;

said return tube receives said process material flow from said first and second flow tubes and extends said material flow towards a user application.

25. The Coriolis flowmeter of claim 20 characterized in that:

said base is u-shaped and has upwardly extending walls;

said first and second flow tubes extend through said walls of said base and have inlet and outlet ends projecting beyond the outer surfaces of said walls.

26. The Coriolis flowmeter of claim 1 characterized in that said flow tube apparatus has high flexibility and a stiffness substantially lower than flow tube apparatus formed of metal or glass.

27. The Coriolis flowmeter of claim 1 characterized in that said flow tube apparatus has waits substantially thinner than the diameter of the inner portion of the flow tube apparatus through which said material flows.

28. The Coriolis flowmeter of claim 1 characterized in that said flow tube apparatus comprises a single flow tube and that said base is substantially U-shaped and has a mass substantially greater than the mass of said flow tube with process material.

29. The Coriolis flowmeter of claim 1 characterized in that said flow tube apparatus has:
- a drive frequency deflection that extends over the entirety of the axial length of the active portion of said flow tube apparatus;
- and further has a Coriolis deflection that extends over the entirety of the axial length of the active portion of said flow tube apparatus.

30. The Coriolis flowmeter of claim 1 characterized in that said base is massive and said flow tube apparatus comprises a single flow tube connected to said massive base to define a dynamically balanced structure when vibrated with material flow by said driver.

31. The Coriolis flowmeter of claim 1 characterized in that:
- said flow tube apparatus comprises a single flow tube defining a dynamically unbalanced structure; and
- said base has a mass sufficiency large to vibrationally communicate with said flow tube so that said Coriolis flowmeter defines a dynamically balanced structure when in use.

32. The Coriolis flowmeter of claim 1 characterized in that said flow tube apparatus comprises at least one flow tube having a substantially constant outer diameter.

33. The Coriolis flowmeter of claim 1 characterized in that said flow tube apparatus is formed of a PFA substance to maintain said process material free from contamination due to ion transfer from said flow tube apparatus to said process material.

34. The Coriolis flowmeter of claim 1 characterized in that said Coriolis flowmeter is adapted to measure a flow of corrosive material including nitric acid.

35. A Coriolis flowmeter for measuring a flow of process material having an ultra high level of purity:
said Coriolis flowmeter comprising:
- a single flow tube formed of a material, such as PFA, that does not transfer ions from said single flow tube to said process material;
- said single flow tube has high flexibility and further has a stiffness substantially lower than a metal or glass flow tube;
- the entirety of the wetted path of said Coriolis flowmeter comprises said PFA material;
- a driver coupled to said single flow tube for vibrating said single flow tube containing said process material;
- a massive base coupled by upwardly extending walls to ends of said single flow tube to absorb undesired vibratory forces generated by said vibrating flow tube;
- said base defines stationary nodes proximate opposing ends of said flow tube;
- an inlet connector connected to said massive base and adapted to receive a flow of said process material from a supply tube;
- an inlet end of said single flow tube is affixed to said inlet connector;
- said input connector sealably connects said inlet end of said single flow tube to an outlet end of said supply tube to effect the extension of said process material flow in said supply tube to said single flow tube;
- said inlet connector maintains said inlet end of said flow tube fixed with respect to said massive base;
- an outlet end of said single flow tube affixed to a second connector for extending said process material flow via an exit tube towards a user destination;
- a pair of pickoffs coupled to said single flow tube on opposite axial sides of said driver for generating signals representing Coriolis induced deflections of said vibrating material filled single flow tube;
- meter electronics; and
- conductors extending signals from said pickoffs to said meter electronics;
- said meter electronics receives said pickoff output signals and generates output information pertaining to said process material flow.

36. The Coriolis flowmeter of claim 35 further comprising;
- a return tube connected to said massive base parallel to said single flow tube;
- end portions of said single flow tubs and said return tube are glued to said massive base to maintain said single flow tube and said return tube immovable with respect to said massive base;
- an inlet of said return tube;
- an intermediate tube connecting said outlet end of said single flow tube and said inlet end of said return tube via said second connector to extend said process material flow from said outlet end of said single flow tube to said inlet of said return tube;
- an outlet connector connected to said massive base for receiving said flow of said process material from said outlet end of said return tube;
- said outlet connector sealably connects said outlet end of said return tube to an inlet end of an exit tube to effect the extension of said process material flow in said return tube to said exit tube;
- said exit tube is adapted to extend said process material flow to a user destination.

37. The Coriolis flowmeter of claim 36 characterized in that said massive base has a pair of upwardly extending parallel side walls having coaxial openings through which said single flow tube and said return tube extend.

38. The Coriolis flowmeter of claim 37 characterized in that said massive base is substantially u-shaped.

39. The Coriolis flowmeter of claim 35 characterized in that said massive base is a solid rectangular element defining a parallelepiped;
- said single flow tube is mounted to upwardly extending posts affixed to a surface of said massive base.

40. The Coriolis flowmeter of claim 37 in which ends of said single flow tube and said return tube extend beyond the outer surface of said upwardly extending walls.

41. The Coriolis flowmeter of claim 35 characterized in that said single flow tube is substantially straight.

42. The Coriolis flowmeter of claim 35 further comprising a second flow tube coupled to said massive base to define a dynamically balanced structure when vibrated by said driver in phase opposition to said single flow tube while containing said process material.

43. The Coriolis flowmeter of claim 35 characterized in that said driver is positioned when in use on a top surface of said single flow tube.

44. The Coriolis flowmeter of claim 35 further comprising:
- a dynamic balancer means coupled to said massive base proximate said nodes to reduce the vibration of said nodes.

* * * * *

UNITED STATES PATENT AND TRADEMARK OFFICE
CERTIFICATE OF CORRECTION

PATENT NO. : 6,776,053 B2
DATED : August 17, 2004
INVENTOR(S) : Martin Andrew Schlosser et al.

It is certified that error appears in the above-identified patent and that said Letters Patent is hereby corrected as shown below:

Column 16,
Line 64, "waits" should be changed to -- walls --.

Column 17,
Line 23, "sufficiency" should be changed to -- sufficiently --.

Column 18,
Line 18, "tubs" should be changed to -- tube --.

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,776,053 B2
DATED : August 17, 2004
INVENTOR(S) : Martin Andrew Schlosser et al.

It is certified that error appears in the above-identified patent and that said Letters Patent is hereby corrected as shown below:

Title page,
Item [73], Assignee, "Emerson Electric, Inc." should be changed to -- Emerson Electric Co. --.

Column 16,
Line 64, "waits" should be changed to -- walls --.

Column 17,
Line 23, "sufficiency" should be changed to --sufficiently --.

Column 18,
Line 18, "tubs" should be changed to -- tube --.

Signed and Sealed this

Twenty-second Day of March, 2005

JON W. DUDAS
*Director of the United States Patent and Trademark Office*